J. WATKINS & J. R. CAREY.
Nutmeg-Grater.

No. 201,138. Patented March 12, 1878.

Witnesses.
S. N. Piper
L. H. Miller

Inventor
John Watkins
John R. Carey
by their attorney
R. H. Eddy

UNITED STATES PATENT OFFICE.

JOHN WATKINS AND JOHN R. CAREY, OF SOMERVILLE, MASSACHUSETTS.

IMPROVEMENT IN NUTMEG-GRATERS.

Specification forming part of Letters Patent No. 201,138, dated March 12, 1878; application filed January 22, 1878.

*To all whom it may concern:*

Be it known that we, JOHN WATKINS and JOHN R. CAREY, of Somerville, of the county of Middlesex and State of Massachusetts, have invented a new and useful Combined Nutmeg-Grater and Dredging-Box; and do hereby declare the same to be described in the following specification and represented in the accompanying drawings, of which—

Figure 1:
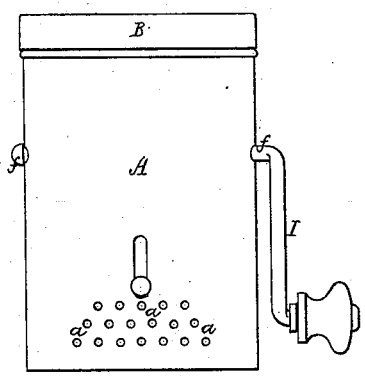
Figure 2:
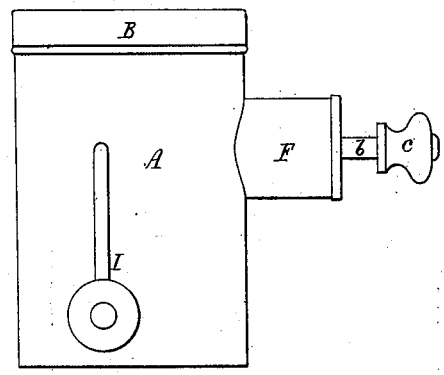
Figure 4:
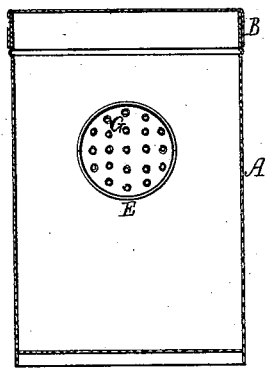
Figure 3:
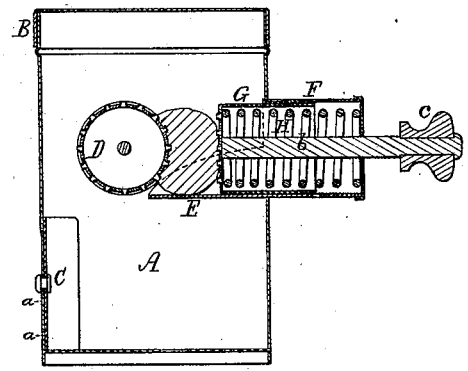
Figure 5:
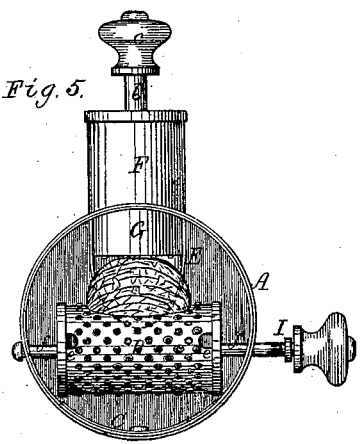

Figure 1 is a front elevation, Fig. 2 a side view, Fig. 3 a longitudinal section, and Fig. 4 a transverse section, of it. Fig. 5 is a top view as it appears when its cover is removed.

Our invention consists, mainly, in a dredge-box, open at top, and having openings and a gate in its lower part, and provided with a nutmeg-supporter, a rotary grater, and its operative crank, and a presser and its actuating-spring shank and knob, arranged and applied and to operate essentially as shown and described.

In such drawings, A denotes a cylindrical box, open at top, and there provided with a cover, B, to fit thereon. Such box has numerous perforations, $a$, through its side, just above its bottom; and within the box, and adapted to slide up and down, so as either to cover or uncover the said perforations, is a gate, C.

Within the box A, and extending across it, is a cylindrical rotary grater, D, which is a drum having perforated rasping-projections extending from it. Besides such, it has one or more openings, $e$, for escape from it of the nutmeg-gratings that may gather within it. This grater has journals $ff$ extending from its opposite ends through holes in the box, one of such journals having a crank, I, fixed to it.

Furthermore, a short spout or nutmeg-supporter, E, projects inward from the inner surface of the box nearly to the circumference of the grater, such spout being to support a nutmeg while it may be in the process of being grated. Arranged with the said spout, and projected from the box, as shown, is a cylindrical tubular extension, F, within which and in the spout is a presser, G, about whose shank $b$ is a helical spring, H, for forcing the said presser toward the grater. The said shank $b$ is furnished with a knob, $c$. On taking hold of the said knob and pulling on it backward, or in line with the shank, the presser may be retracted to enable a nutmeg to be placed in the spout and between the presser and the grater.

By revolving the grater the nutmeg will be rasped or grated by the grater, and will be advanced by the presser and its operative spring until it (the said nutmeg) may be entirely reduced, the raspings being caused to drop from the grater into the box, from which they may be expelled or shaken through its perforations, as occasion may require.

If preferable, the perforations and their gate may be either in the top or bottom of the box.

The advantage of having the holes $e$ located on the periphery of the cylinder outside of the grating-surface is that, when located on the periphery of the grating-surface, the ground nutmeg immediately escapes from the interior of the cylinder; but if placed within the grating-surface, (as has heretofore been done,) the edges of these openings are liable to catch on the nutmeg, which liability is avoided when the holes are located outside the grating-surface.

We do not claim a nutmeg-grater open at its end next the rasping-surface or cylinder, and having appliances for supporting and rasping a nutmeg. Nor do we claim a dredge-box nor a nutmeg-grater provided with a sifting-cloth, as they are old.

We claim—

1. The improved device comprising the dredge-box A, having cover B, perforations $a$, and gate C, and the grater D, with its nutmeg-supporter E and presser G, united as described.

2. The grater provided with one or more holes of discharge located in the periphery of the cylinder outside of the grating-surface.

JOHN WATKINS.
JOHN R. CAREY.

Witnesses:
R. H. EDDY,
JOHN R. SNOW.